United States Patent [19]
Anderson

[11] Patent Number: 5,963,313
[45] Date of Patent: Oct. 5, 1999

[54] OPTICAL TIME DOMAIN REFLECTOMETER WITH BANDWIDTH CORRECTION

[75] Inventor: Duwayne R. Anderson, Redmond, Oreg.

[73] Assignee: Tektronix, Inc., Wilsonville, Oreg.

[21] Appl. No.: 09/079,887

[22] Filed: May 15, 1998

[51] Int. Cl.$^6$ .................................................. G01N 21/00
[52] U.S. Cl. ............................................................. 356/73.1
[58] Field of Search ........................... 356/73.1; 324/534, 324/642; 330/59; 359/189

[56] References Cited

U.S. PATENT DOCUMENTS

| | | | |
|---|---|---|---|
| 5,155,439 | 10/1992 | Holmbo et al. | 324/534 |
| 5,410,282 | 4/1995 | Larrick et al. | 330/149 |
| 5,442,434 | 8/1995 | Liao et al. | 356/73.1 |
| 5,528,356 | 6/1996 | Harcourt | 356/73.1 |

Primary Examiner—Robert H. Kim
Assistant Examiner—Tu T. Nguyen
Attorney, Agent, or Firm—William K. Bucher

[57] ABSTRACT

An optical time domain reflectometer (OTDR) is treated as a linear shift-invariant system modeled as a ideal resistive-capacitive network. A step pulse is applied to a fiber under test and the return optical energy from the fiber under test is converted to signal samples representative of the return optical energy. The signal samples are processed in a controller for producing step impulse stimulus signal samples corrected for the bandwidth limited system response of the optical time domain reflectometer by modeling the OTDR as an exponential linear shift-invariant system that includes the optical transmitter, optical receiver and the fiber under test. The controller takes the time derivative of the step impulse stimulus signal samples for generating signal samples representative of the impulse response for the fiber under test. Standard OTDR interrogating pulses may be used to produce signal samples representing the ideal impulse response with bandwidth correction over the region of the pulsewidth for improved event dead zone accuracy.

15 Claims, 3 Drawing Sheets

OPTICAL TIME DOMAIN REFLECTOMETER WITH BANDWIDTH CORRECTION

BACKGROUND OF THE INVENTION

The present invention relates generally to optical time domain reflectometry and more specifically to an optical time domain reflectometer using a step-impulse response for characterizing an optical fiber.

A traditional optical time domain reflectometer (OTDR) tests an optical fiber by launching optical pulses at a particular wavelength into the fiber under test and acquiring waveform data to represent a display trace of the return optical energy from the fiber. The OTDR, under operator control, determines the portion of the test fiber to be examined, the pulse width and wavelength of the optical pulses to be launched into the test fiber, the sample density or spacing between acquired data points, the amount of averaging for each acquired data point, and the like. A series of optical pulses are launched into the test fiber. During the period between each test pulse, a return reflected optical signal in the form of Rayleigh scattering and reflections due to mechanical spices, connector, and the like is received in an optical receiver, converted to an electrical signal and sampled in accordance with the preselected sample density. The acquired waveform data is stored in memory and further processed to locate and measure events on the test fiber. When using this technique, a trade off must be made between event resolution and dynamic range.

In "Optical Time-Domain Reflectometry" by Duwayne Anderson and Florian Bell, published by Tektronix, Inc., 1997, a number of OTDR parameters are discussed. One important parameter for an OTDR is its ability to resolve closely spaced events. This relates to the instrument's time resolution and the ability of the OTDR to identify two discrete reflective events separated by a short distance, called event resolution or event dead zone (EDZ). In a single mode OTDR this value can be as low as one meter. For a multimode OTDR the shortest EDZ is about twenty centimeters.

A simplified OTDR system response can be modeled as a single-pole amplifier with the rising edge of a pulse given by:

$$5 \log(1-e^{-t/\tau}) \qquad (1)$$

where t is the time constant of the resistive-capacitive (RC) network in the single-pole model. The rate at which the pulse falls is given by:

$$5\log(e^{-t/\tau}) \approx -2.171 \cdot \frac{t}{\tau} \qquad (2)$$

Because the system has a limited bandwidth, the fall time of the pulse is not infinitely fast. If there are two reflective events closely spaced, there is a critical separation such that the signal from the first event does not significantly fall before the signal from the second event becomes appreciable. When two refections are spaced closer together than this limit, they become essentially indistinguishable. This is defined as the event dead zone. It is equal to the distance between the leading edge of a reflection and the point on the falling edge where the signal level drops 3 dB below the top of the refection. The EDZ is defined in terns of how a human operator would identify two closely spaced events. However, some modern OTDRs with sophisticate event-detection algorithms are able to automatically detect events whose spacing is smaller than the event dead zone.

Another parameter used for specifying OTDR performance is the attenuation dead zone (ADZ) or loss-measurement dead zone (LMDZ). Discrete reflective events in a fiber under test produce large return reflections that temporarily saturate the optical detector and preamplifier in the receiver. It can take as long as a microsecond (100 meters in distance, as viewed on and OTDR display) for the detector to recover fully from these reflective pulses. Even without saturation, the amplifier is still bandwidth limited so the receiver cannot return immediately to the backscatter level. An additional spurious signal, called detector tail, caused by slow currents in the detector may also be present. When any of these effects (saturation, bandwidth limitations, or tail) are present in sufficient quantities, no useful information can be easily obtained from the OTDR signal due to distortion. The distance over which the normal OTDR signal is distorted due to saturation, bandwidth effects, or detector tail, is the LMDZ or ADZ of the instrument.

U.S. Pat. No. 5,528,356, assigned to the assignee of the present invention, describes an OTDR that acquires and stores waveform data points having multiple waveform segments with each waveform segment having data points acquired using different pulsewidths, sample spacing and starting distance. The waveform segments are defined in terms of the noise floor. The gain of the OTDR receiver amplifier may be increased for the various waveform segment acquisitions in conjunction with other parameters, such as the pulsewidth, averaging and the like, to increase the signal to noise ratio within the segment. The width of displayed events on an OTDR are at a minimum equal to the pulsewidth of the interrogating pulses. For detecting closely spaced events, it is desirable to use a narrow pulsewidth interrogating pulse. However, the narrow pulsewidth interrogating pulses inject less optical energy into the fiber resulting in less dynamic range. Longer pulsewidths are used where dynamic range or signal-to-noise is more important. In the OTDR described in the '356 patent, narrow pulsewidth interrogating pulses are used for the first segment of the fiber, with increasing longer pulsewidth interrogating pulses used for subsequent segments. The use of narrow pulsewidth interrogating pulses over the first segment of the fiber is well suited for measuring closely spaced connectors and spices found in telephone company central offices. The longer pulsewidth interrogating pulses are well suited for measuring the fiber between central offices. However, there may be closely spaced connectors and splices at some distance from the central office that may not be detectable as separate events because of the pulsewidth of the interrogating pulse and the event dead zone and attenuation dead zone. In addition, even close-in closely spaced events may not be detectable as separate events using narrow pulsewidth interrogating pulses because of the bandwidth limits of the OTDR system.

What is needed is an optical time domain reflectometer having improved event detection resolution by compensating for the bandwidth and pulsewidth limitations of the OTDR.

SUMMARY OF THE INVENTION

Accordingly, an object of the present invention is an optical time domain reflectometer having improved event detection resolution.

An additional object of the present invention is an optical time domain reflectometer that compensates for bandwidth limitations of the OTDR system response.

A further object of the present invention is an optical time domain reflectometer that measures the impulse response of the OTDR and fiber combination with the equivalent of an infinitely narrow pulse.

The optical time domain reflectometer with bandwidth correction includes an optical transmitter that launches interrogating optical step pulses into a fiber under test. An optical receiver receives optical return energy from the fiber under test and generates signal samples representative of the optical return energy. A controller receives the signal samples and produces step impulse stimulus signal samples corrected for the bandwidth limited system response of the optical time domain reflectometer by modeling the OTDR as an exponential linear shift-invariant system that includes the optical transmitter, optical receiver and the fiber under test. The controller takes the time derivative of the step impulse stimulus signal samples for generating signal samples representative of the impulse response for the fiber under test.

In a first embodiment of the optical time domain reflectometer with bandwidth correction, the optical step pulses are greater than the fiber under test length, or greater than the distance to where the backscatter signal level equals the noise floor level. In a second embodiment, the optical step pulses have a pulsewidth defined by a rising pulse edge and a falling pulse edge. When using a pulsewidth defined step pulse, the controller produces step impulse stimulus signal samples corrected for the bandwidth limited system response of the optical time domain reflectometer over the pulsewidth and generates signal samples representative of the impulse response for the fiber under test by taking the time derivative of the step impulse stimulus signal samples over the pulsewidth. The optical time domain reflectometer with bandwidth correction further includes a means for displaying the bandwidth corrected signal samples.

The optical time domain reflectometer with bandwidth correction may also be implemented with the controller receiving the signal samples and producing step impulse response signal samples of the optical time domain reflectometer and fiber under test by taking the time derivative of the signal samples representative of the optical return energy. The controller generates signal samples representative of the impulse response of the fiber under test corrected for the bandwidth limited system response of the optical time domain reflectometer by modeling the optical time domain reflectometer as an exponential linear shift-invariant system that includes the optical transmitter, optical receiver and the fiber under test.

The method of generating bandwidth corrected signal samples of optical return energy from a fiber under test where bandwidth limited signal samples are generated by launching interrogating optical step pulses into the fiber under test from an optical transmitter and generating the bandwidth limited signal samples from an optical receiver for processing by a controller includes the steps of producing step impulse stimulus signal samples corrected for the bandwidth limited system response of the optical transmitter and optical receiver by modeling the optical transmitter, optical receiver and the fiber under test as an exponential linear shift-invariant system and generating signal samples representative of the impulse response for the fiber under test by taking the time derivative of the step impulse stimulus signal samples.

The method of generating bandwidth corrected signal samples of optical return energy from a fiber under test may also be implemented by the controller using steps that include producing step impulse response signal samples of the optical transmitter, optical receiver and fiber under test by taking the time derivative of the signal samples representative of the optical return energy, and generating signal samples representative of the impulse response of the fiber under test corrected for the bandwidth limited system response of the optical transmitter and receiver by modeling the optical transmitter, optical receiver and the fiber under test as an exponential linear shift-invariant system.

The method of generating bandwidth corrected signal samples of optical return energy from a fiber under test using an optical time domain reflectometer includes the steps of generating interrogating optical step pulses that are launched into the fiber under test using an optical transmitter and generating bandwidth limited signal samples of the optical return energy using an optical receiver. Step impulse stimulus signal samples corrected for the bandwidth limited system response of the optical time domain reflectometer are produced by modeling the OTDR as an exponential linear shift-invariant system that includes the optical transmitter, optical receiver and the fiber under test. Signal samples representative of the impulse response for the fiber under test are generated by taking the time derivative of the step impulse stimulus signal samples.

In a first embodiment, the optical step pulse generating step produces interrogating optical step pulses that are greater than the length of the fiber under test, or greater than the distance to where the backscatter signal level equaling the noise floor level. In a further embodiment, the interrogating optical pulses have a pulsewidth defined by a rising pulse edge and a falling pulse edge. Step impulse stimulus signal samples are produced over the pulsewidth of the interrogating pulse and the signal samples representative of the impulse response for the fiber under test are generated by taking the time derivative of the step impulse stimulus signal samples over the pulsewidth. The method of generating bandwidth corrected signal samples of optical return energy from a fiber under test using an optical time domain reflectometer includes the additional step of displaying the bandwidth corrected signal samples.

The method of generating bandwidth corrected signal samples of optical return energy from a fiber under test using an optical time domain reflectometer may further be implemented with the controller using steps that include producing step impulse response signal samples of the optical time domain reflectometer and fiber under test by taking the time derivative of the signal samples representative of the optical return energy, and generating signal samples representative of the impulse response of the fiber under test corrected for the bandwidth limited system response of the optical time domain reflectometer by modeling the optical time domain reflectometer as an exponential linear shift-invariant system that includes the optical transmitter, optical receiver and the fiber under test.

The objects, advantages and novel features of the present invention are apparent from the following detailed description when read in conjunction with the appended claims and attached drawings.

DETAILED DESCRIPTION OF THE PREFERRED EMBODIMENT

Figure 1:
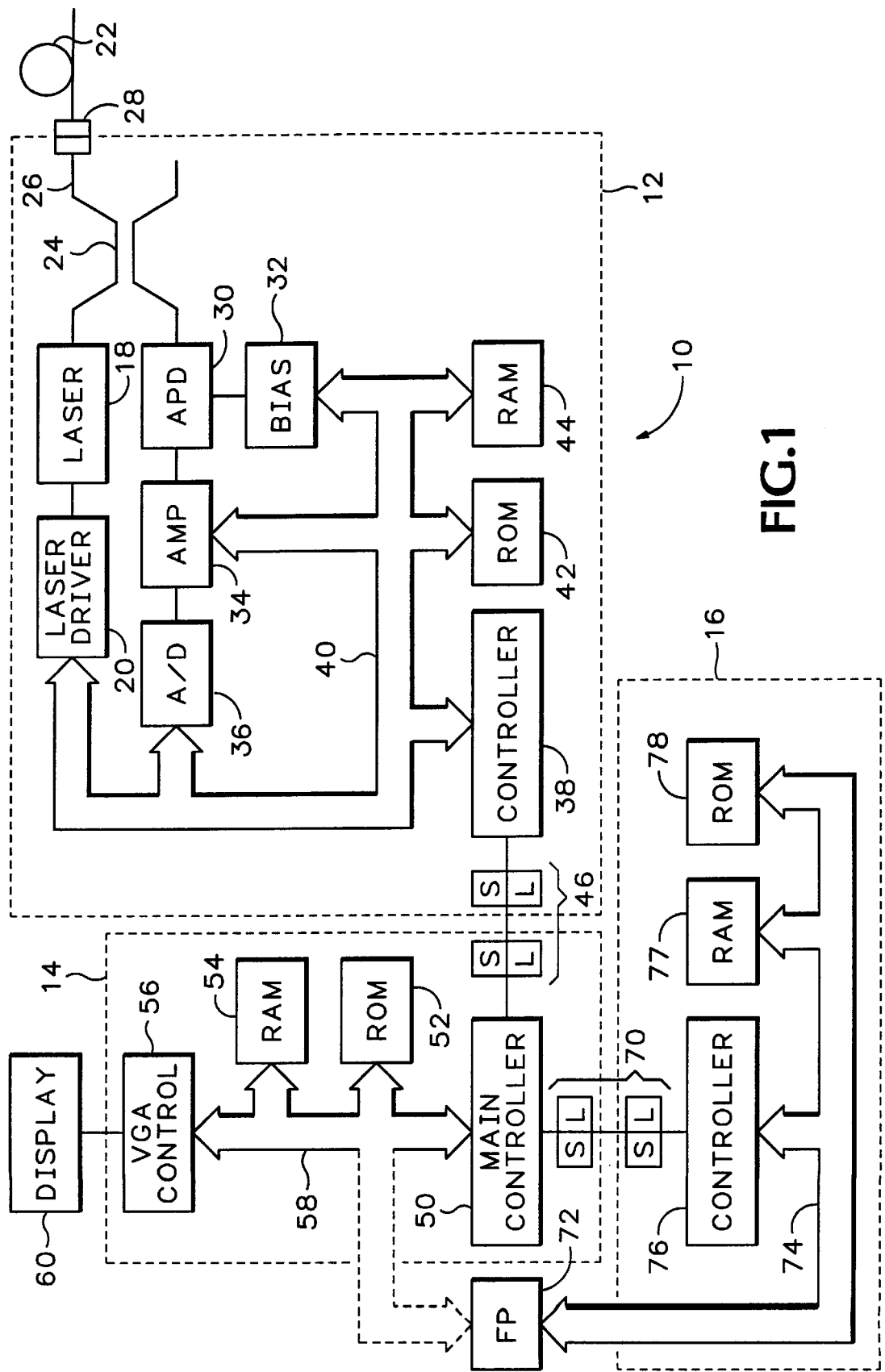
FIG. 1 is a block diagram of an optical time domain reflectometer with bandwidth correction according to the present invention.

Referring to FIG. 1, there is shown a block diagram of an optical time domain reflectometer, OTDR, 10 with bandwidth correction according to the present invention. The OTDR comprises a digital acquisition section 12 (DAS), a main processing section 14, and a power supply section 16. The DAS 12 has a laser diode 18 that is energized intermittently by a laser driver 20 to launch interrogating pulses into a test fiber 22 by the way of a directional coupler 24 and a launch fiber 26, which is connected to test fiber 22 by a connector 28. OTDR 10 receives return reflected energy from the test fiber 22 due to Rayleigh backscattering and Fresnel reflections. The intensity of the backscattered and reflected energy depends on the condition of the test fiber 22.

A portion of the return energy received from the test fiber 22 is coupled through coupler 24 to a photodetector 30, such as an avalanche photodiode, APD, which generates a current signal representative of the intensity of the return energy. The avalanche photodiode 30 is coupled to a voltage biasing circuit 32, which applies a varying voltage to the APD 30 for varying the gain of the device. The current signal from the APD 30 is converted to a voltage signal and amplified by a variable gain transimpedance amplifier 34. The amplified voltage signal is sampled and converted to a digital form by analog-to-digital converter (ADC) 36. A digital signal processor controller 38 controls the timing of the ADC 36 relative to the laser driver 20, the voltage output of the voltage biasing circuit 32 and the gain of the transimpedance amplifier 34 via digital bus 40 in response to executable routines stored in ROM 42. ROM 42 and RAM 44 are also coupled to the bus 40. RAM 44 accumulates the digital signal samples from the ADC 36 representative of the optical energy at selected points in the test fiber in a data buffer. Repetitive interrogations of the test fiber 22 provide additional signal samples at the selected points, which are averaged with previously stored signal samples. RAM 44 also stores parameter data passed to the DAS 12 from the main processor section 14 via serial data link 46. The averaged signal samples in RAM 44 are transferred to the main processor section 14 via the serial data link 46.

The main processor section 14 includes a controller 50, such as a Motorola 68340 microprocessor, coupled to ROM 52, RAM 54 and a display controller 56 via digital bus 58. In the preferred embodiment the ROM 52 is downloadable flash EPROMs and the display controller 56 is a standard VGA type controller coupled to a 640×480 pixel array display device 60, such as a liquid crystal LCD display, cathode ray tube or other device having a rectangular array of addressable pixels. The ROM 52 contains control logic and signal sample processing routines for implementing the step-impulse OTDR with bandwidth correction to be described in greater detail below. RAM 54 includes a data buffer for receiving the signal samples from the DAS 12. RAM 54 also includes a video frame buffer for storing bit mapped data to be displayed on the display device 60.

Traditionally, an OTDR launches a roughly square impulse optical pulse into the optical fiber, and measures the system's response to the square pulse. The system is defined as the transmitter and receiver of the OTDR and the fiber under test. Due to the previously described bandwidth limitations of the OTDR receiver, the system response is not ideal and produces a characteristic dead zone. To a first order approximation, it is possible to model the OTDR and fiber system as an ideal resistance-capacitance (RC) network. An ideal RC network is a linear shift-invariant system governed by the differential equation:

$$r_j = r_{j-1} + (s_j - r_{j-1}) \cdot k \tag{3}$$

where k is a constant, $r_j$ is the response (output) of the system (sampled in time), and $s_j$ is the system input, or stimulus (sampled in time). When k equals 1, the output function exactly equals the input function. When k does not equal 1, the output and input differ. The exponentially rising edge of an ideal RC circuit is given by the equation:

$$e(t) = \begin{cases} 1 - \exp(-t/\tau) \text{ for } t \geq 0 \\ 0 \text{ for } t \leq 0 \end{cases} \tag{4}$$

where $\tau$ is the characteristic rise time. From this, the relationship between k in equation (3), and the characteristic rise time of the exponential is:

$$k = 1 - \exp(-\Delta t/\tau) \tag{5}$$

For the best dead zone, the ideal pulse would be one with no width. If this could be done, the impulse response of the OTDR would be obtained. In actuality, the impulse response would be for the OTDR and fiber under test. However, the fiber's impulse response compared with the OTDR response is essentially a delta function, so that the system impulse response is essentially all due to the OTDR. The impulse function is defined by:

$$\delta(x) = \lim_{b \to 0} \frac{1}{|b|} Gaus\left(\frac{x}{b}\right) \tag{6}$$

where $$Gaus(x) = \exp\left(-\pi \cdot \left(\frac{x}{b}\right)^2\right) \tag{7}$$

Note that the area of the impulse function equals 1, and that the height of the impulse function is infinite.

An interesting feature of linear-invariant systems is that they can be defined as those systems whose outputs are equal to the convolution of the input stimulus function with the system's impulse response as shown by:

$$S(f(t)) = I_S(t) \otimes s(t) = r(t) \tag{8}$$

In equation (8), s(t) is the stimulus to the system, $I_s(t)$ is the system's impulse response, r(t) is the system's output and ⊗ denotes convolution. According to equation (8), the output of a LSI system that receives a step impulse input is:

$$e(t) = I_S(t) \otimes \text{step}(t) \tag{9}$$

where e(t) is the system's step-impulse, or edge response. Writing out the convolution results in:

$$e(t) = \int_{-\infty}^{\infty} \text{step}(t) \cdot I_S(t-\tau) d\tau \qquad (10)$$

The step impulse is defines as:

$$\text{step}(t) = \begin{vmatrix} 0 \text{ if } t \leq 0 \\ 1 \text{ if } t > 0 \end{vmatrix} \qquad (11)$$

Substituting equation (11) into (10), taking the time derivative of the edge response, and simplifying:

$$\frac{d}{dt} e(t) = -I_S(t-\infty) - (-I_S(t-0)) \qquad (13)$$

$$\frac{d}{dt} e(t) = I_S(t) \qquad (14)$$

Equation (14) assumes $-I_s(t-\infty)=0$ and states that system's impulse response is obtained by taking the time derivative of a system's step-impulse response. If a long optical pulse is launched into a fiber under test, the step-impulse response is obtained from a measure of the backscatter energy. An assumption here is that the fiber is shorter than the pulse launched into the fiber under test or the pulse is longer than the distance to where the backscatter signal level equals the noise floor level. As will be described later, the invention may be implemented over the length of a pulsewidth that is shorter than the fiber under test. The impulse response is obtained (equation 14) by taking the time derivative of the step-impulse response. Waveform trace 102 in FIG. 4 and waveform trace 110 in FIG. 5 represent the impulse response of the OTDR 10 and the fiber under test to a step impulse applied to the fiber under test. The dead zone of the impulse response is limited only by the system bandwidth, and is the response that would be obtained if an impulse function is introduced to the OTDR. The system bandwidth of the OTDR includes the bandwidth of the optical receiver, the receiver amplifier, the laser and the laser driver.

The system bandwidth of an OTDR may be effectively described as a single bandwidth. Upon acquisition of a step-impulse response, a waveform vector is defined by equation (3) where k is given by equation (4) and $\tau$ is the characteristic time constant of the system bandwidth. In equation (3), the $r_j$ are the data points of the system response, and the $s_j$ are the data points of the ideal system stimulus. In the OTDR with bandwidth correction of the present invention, the $s_j$ are the bandwidth corrected signal samples of the step impulse and the $r_j$ are the bandwidth uncorrected signal samples of the system step-impulse response. Because the OTDR and fiber system is being treated as a linear non-invariant system, equation (3) may be solved in reverse.

$$s_j = \frac{r_j + r_{j-1}(k-1)}{k} \qquad (15)$$

Consequently, given the system's step-impulse response which is limited by bandwidth and k from equation (5), the system step-impulse stimulus with bandwidth effects removed can be recovered. The time derivative of the step-impulse stimulus is taken to obtain the impulse response of the fiber under test with the bandwidth limitations of the OTDR removed.

Figure 2:
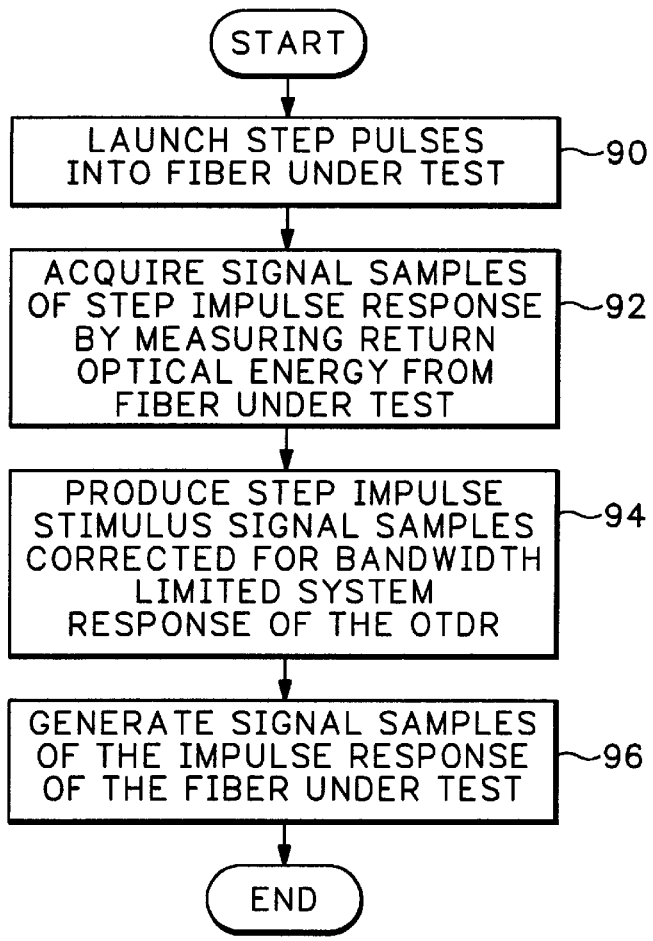
FIG. 2 is a flow chart showing the steps in implementing the optical time domain reflectometer with bandwidth correction according to the present invention.

Referring to FIG. 2, there is flow chart showing the procedure for generating bandwidth corrected signal samples using an ideal infinite bandwidth impulse response for an OTDR 10. Laser 18 generates step pulses that are launched into the fiber under test 22 in response to commands from the controller 34 in the DAS 12 that receives instructions from the main controller 50 as represented in step 90. The return optical energy from the fiber under test 22 is converted to an electrical signal by the APD 30 and amplified by amplifier 34. The amplified electrical signal is coupled to the A/D converter 36 that produces signal samples representative of the optical energy from the test fiber 22 as represented by step 92. Repetitive interrogations of the test fiber 22 provide additional signal samples, which are averaged with previously stored samples. The averaged signal samples in RAM 44 are transferred to the main processor section 14 via the serial data link 46 and stored in RAM 54. It is important that the OTDR's optical receiver is not saturated by any reflective event in the return optical energy.

The signal samples stored in RAM 54 are accessed by the main controller 50 and processed by application of equation (15) to produce step impulse stimulus signal samples corrected for the bandwidth limited system response of the optical time domain reflectometer 10 as represented by step 94. The controller 50 takes the time derivative of the step impulse stimulus signal samples by application of equation (14) for generating signal samples representative of the impulse response for the fiber under test 22 as represented by step 96. It should be noted that equations (14) and (15) can be applied in either order to the acquired signal samples from the fiber under test to obtain the impulse response of the fiber under test with bandwidth correction.

Figure 3:
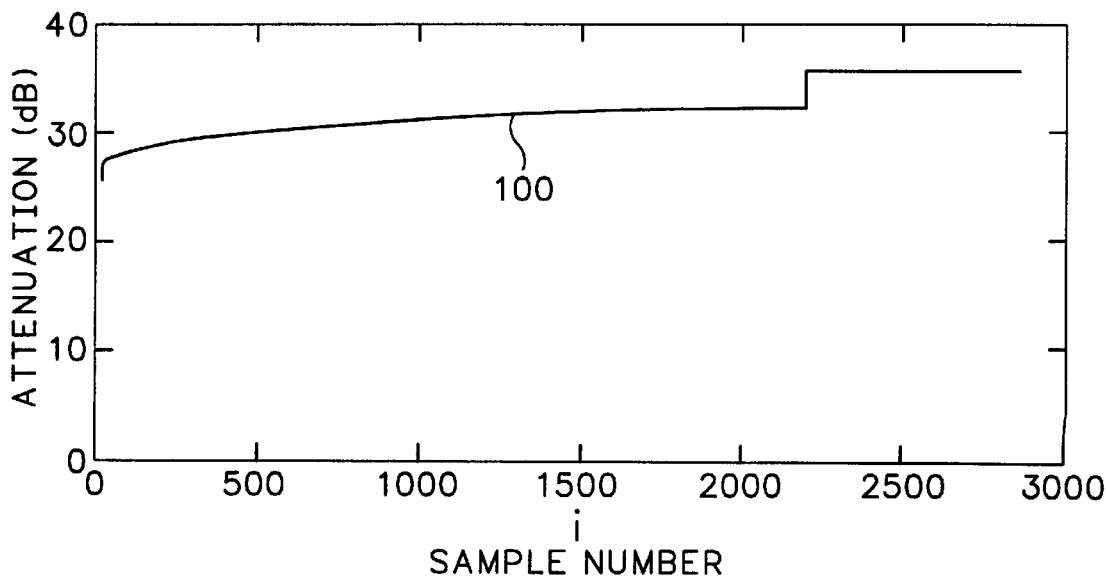
FIG. 3 is an uncorrected step-impulse OTDR trace representing the return optical energy from the fiber under test in the optical time domain reflectometer with bandwidth correction according to the present invention.
Figure 4:
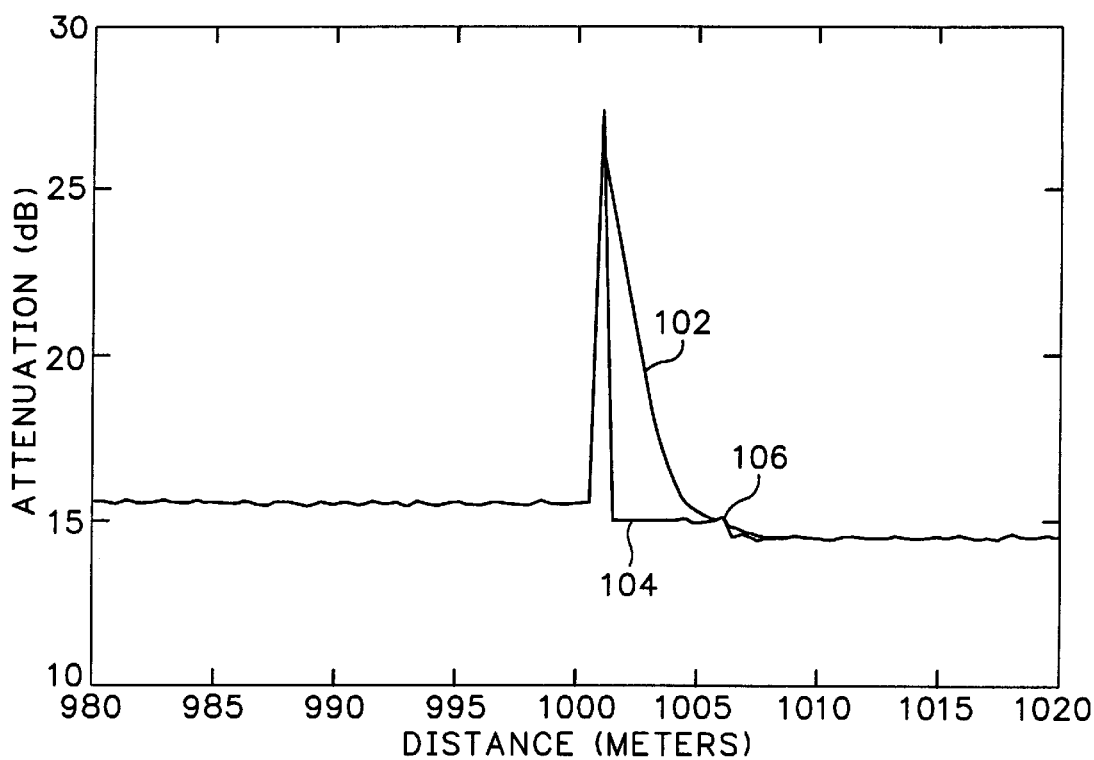
FIGS. 4 and 5 show waveform traces of uncorrected and bandwidth corrected data from the optical time domain reflectometer with bandwidth correction according to the present invention.
Figure 5:
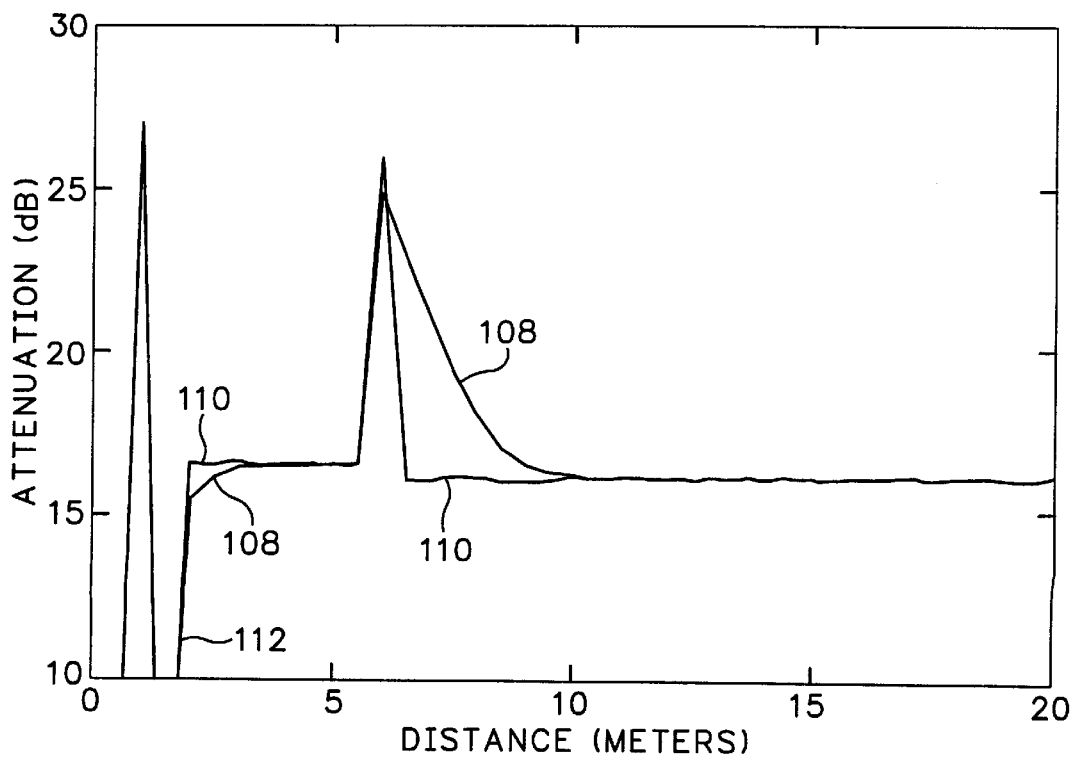

FIGS. 3, 4 and 5 are waveforms traces of signal samples showing the results of the bandwidth correction used in the OTDR 10. The results were obtained from modeling with synthetic waveforms representing events in an optical fiber. FIG. 3 shows signal samples of an uncorrected step-impulse OTDR trace 100 representing the return optical energy from the fiber under test. The trace shows a rapidly rising leading edge that is caused by a front panel reflection, followed by a gradually rising waveform that results from the exponential decay of the backscatter signal.

FIGS. 4 and 5 show examples of the impulse response of the OTDR with and without bandwidth correction. Trace 102 represents the OTDR and fiber under test impulse response without bandwidth correction and trace 104 represents the impulse response of the fiber under test with bandwidth correction. In both instances the OTDR's dead zone is shorter than it would be when using a finite pulsewidth. As can be seen from the traces, the dead zone is considerably improved by the application of equation (15) for bandwidth correction. A 0.5 dB fusion spice 106 showing as a reflectionless loss would go undetected using the uncorrected trace 102 but is easily discernable in the bandwidth corrected trace 104. It should be noted that the effectiveness of the equation in correcting for bandwidth depends upon the degree to which the OTDR's system response may be described as a single bandwidth. Carrier diffusion in the APD 30, for example, violates this assumption so the real OTDRs will not exhibit bandwidth correction effects as striking as those shown in FIG. 4.

FIG. 5 is another example of the impulse response of the OTDR with and without bandwidth correction highlighting that part of the waveform near the front panel. Trace 108 represents the OTDR and fiber under test impulse response without bandwidth correction and trace 110 represents the impulse response of the fiber under test with bandwidth correction. The drop-out 112 in FIG. 5 is a processing artifact caused by the fact that there is no fiber before the front-panel reflection. Internal fiber before the front panel as described in U.S. Pat. No. 5,062,704, or post processing could remove this artifact. The artifact does not appear for any other events on the waveform. As was the case with the previous figure, the dead zone is considerably improved by the application of equation (15) for bandwidth correction.

The OTDR 10 with bandwidth correction has been described up to this point with step pulses being launched into the fiber under test. The invention also may be implemented using traditional finite length interrogating pulses having rising and falling edges. The impulse response of the fiber under test is determined over the pulsewidth of the interrogating pulse. For example, one kilometer interrogating pulses are launched into the fiber under test and the return reflected optical energy from the first kilometer of fiber is the step response, which essentially masks events within the first kilometer. The signal samples over the first kilometer are bandwidth corrected according to equation (15) to produce step impulse stimulus signal samples corrected for the bandwidth limited system response of the optical time domain reflectometer over the pulsewidth. The time derivative of the step impulse stimulus signal samples is taken for generating signal samples representative of the impulse response for the fiber under test over the pulsewidth. This would provide very fine measurement resolution even with a one kilometer pulse. It should be noted that the measurement resolution is also a function of the sample spacing of the signal samples. Therefore, the sample spacing over the first kilometer should be commensurate with the measurement resolution one wishes to achieve. As samples are acquired farther along the fiber, the sample spacing would decrease for faster data acquisition. The bandwidth corrected samples over the first kilometer would then be combined with the samples acquired at the different sample spacing to produce an OTDR trace having bandwidth corrected signal samples over the first kilometer and uncorrected samples for the rest of the fiber.

Additionally, the OTDR 10 with bandwidth correction may be used to improve the event dead zone characterization of closely spaced events. As has been stated, longer pulsewidths are used in characterizing a fiber when the dynamic range is important. A one kilometer pulsewidth pulse provides greater dynamic range than a one meter pulsewidth but provides less event dead zone resolution. Using the OTDR with bandwidth correction improves event dead zone characterization of closely spaced events at distances on a fiber inaccessible to narrow pulsewidth interrogating pulses. For example, the fiber under test is characterized using one kilometer pulsewidth interrogating pulses and events in the fiber are detected and characterized. Step impulse stimulus signal samples corrected for the bandwidth limited system response of the optical time domain reflectometer are produced from the acquired signal samples over the pulsewidth. Signal samples representative of the impulse response for the fiber under test over the pulsewidth are generated by taking the time derivative of the step impulse stimulus signal samples. If greater sample spacing resolution is desired or necessary, the region containing the event may be reexamined with increased sample spacing and the ideal impulse response with bandwidth correction is determined. The bandwidth corrected signal sampled may be spliced into the previously acquired signal samples to provide a waveform trace on the OTDR display containing the uncorrected signal samples representing the backscatter return energy and the bandwidth corrected signal samples representing the events in the fiber.

An optical time domain reflectometer with bandwidth correction has been described where the OTDR and fiber is treated as a linear shift-invariant system modeled as a ideal resistive-capacitive network. A step pulse is applied to a fiber under test and the return optical energy from the fiber under test is converted to signal samples representative of the return optical energy. The signal samples are processed by a controller for producing step impulse stimulus signal samples corrected for the bandwidth limited system response of the optical time domain reflectometer by modeling the OTDR as an exponential linear shift-invariant system that includes the optical transmitter, optical receiver and the fiber under test. The controller takes the time derivative of the step impulse stimulus signal samples for generating signal samples representative of the impulse response for the fiber under test. The step-impulse OTDR can use traditional interrogating pulses with defined pulsewidth. Step impulse stimulus signal samples corrected for the bandwidth limited system response of the optical time domain reflectometer are produced from the acquired signal samples over the pulsewidth. Signal samples representative of the impulse response for the fiber under test over the pulsewidth are generated by taking the time derivative of the step impulse stimulus signal samples. It will be obvious to those having skill in the art that many changes may be made to the details of the above-described embodiments of this invention without departing from the underlying principles thereof. The scope of the present invention should, therefore, be determined only by the following claims.

What is claimed is:

1. An optical time domain reflectometer having a bandwidth limited system response with bandwidth correction comprising:

an optical transmitter launching interrogating optical step pulses into a fiber under test;

an optical receiver receiving optical return energy from the fiber under test and generating signal samples representative of the optical return energy; and a controller receiving the signal samples and producing step impulse stimulus signal samples corrected for the bandwidth limited system response of the optical time domain reflectometer by modeling the optical time domain reflectometer and the fiber under test as an exponential linear shift-invariant system that includes the optical transmitter, optical receiver and the fiber under test and generating signal samples representative of the impulse response for the fiber under test by taking the time derivative of the step impulse stimulus signal samples.

2. The optical time domain reflectometer with bandwidth correction as recited in claim 1 wherein the optical transmitter generates optical step pulses that are greater than the fiber under test length.

3. The optical time domain reflectometer with bandwidth correction as recited in claim 1 wherein the optical return energy includes an exponentially decreasing Rayleigh backscatter signal level from the fiber under test and the optical receiver has a noise floor level with the optical transmitter generating optical step pulses greater than the distance to where the backscatter signal level equals the noise floor level.

4. The optical time domain reflectometer with bandwidth correction as recited in claim 1 wherein the optical transmitter generates optical step pulses having a pulsewidth defined by a rising pulse edge and a falling pulse edge with the controller producing step impulse stimulus signal samples corrected for the bandwidth limited system response of the optical time domain reflectometer over the pulsewidth and generating signal samples representative of the impulse response for the fiber under test over the pulsewidth by taking the time derivative of the step impulse stimulus signal samples.

5. The optical time domain reflectometer with bandwidth correction as recited in claim 1 further comprising a means for displaying the bandwidth corrected signal samples.

6. An optical time domain reflectometer having a bandwidth limited system response with bandwidth correction comprising:

an optical transmitter launching interrogating optical step pulses into a fiber under test;

an optical receiver receiving optical return energy from the fiber under test and generating signal samples representative of the optical return energy; and a controller receiving the signal samples and producing step impulse response signal samples of the optical time domain reflectometer and fiber under test by taking the time derivative of the signal samples representative of the optical return energy and generating signal samples representative of the impulse response of the fiber under test corrected for the bandwidth limited system response of the optical time domain reflectometer by modeling the optical time domain reflectometer and the fiber under test as an exponential linear shift-invariant system that includes the optical transmitter, optical receiver and the fiber under test.

7. A method of generating bandwidth corrected signal samples of optical return energy from a fiber under test where interrogating optical step pulses are launched into the fiber under test from an optical transmitter and bandwidth limited signal samples are generated by an optical receiver for processing by a controller comprising the steps of:

producing step impulse stimulus signal samples corrected for the bandwidth limited system response of the optical transmitter and optical receiver by modeling the optical transmitter, optical receiver and the fiber under test as an exponential linear shift-invariant system; and generating signal samples representative of the impulse response for the fiber under test by taking the time derivative of the step impulse stimulus signal samples.

8. A method of generating bandwidth corrected signal samples of optical return energy from a fiber under test where interrogating optical step pulses are launched into the fiber under test from an optical transmitter and bandwidth limited signal samples are generated by an optical receiver for processing by a controller comprising the steps of:

producing step impulse response signal samples of the optical transmitter, optical receiver and fiber under test by taking the time derivative of the signal samples representative of the optical return energy; and generating signal samples representative of the impulse response of the fiber under test corrected for the bandwidth limited system response of the optical transmitter and receiver by modeling the optical transmitter, optical receiver and the fiber under test as an exponential linear shift-invariant system.

9. A method of generating bandwidth corrected signal samples of optical return energy from a fiber under test using an optical time domain reflectometer having a bandwidth limited system response comprising the steps of:

generating interrogating optical step pulses that are launched into the fiber under test using an optical transmitter;

generating bandwidth limited signal samples of the optical return energy using an optical receiver;

producing step impulse stimulus signal samples corrected for the bandwidth limited system response of the optical time domain reflectometer and the fiber under test by modeling the optical time domain reflectometer as an exponential linear shift-invariant system that includes the optical transmitter, optical receiver and the fiber under test; and generating signal samples representative of the impulse response for the fiber under test by taking the time derivative of the step impulse stimulus signal samples.

10. The method of generating bandwidth corrected signal samples of an optical return signal from a fiber under test using an optical time domain reflectometer as recited in claim 9 wherein the optical step pulse generating step generates interrogating optical step pulses that are greater than the length of the fiber under test.

11. The method of generating bandwidth corrected signal samples of an optical return signal from a fiber under test using an optical time domain reflectometer as recited in claim 9 wherein the optical return energy includes an exponentially decreasing Rayleigh backscatter signal level from the fiber under test and the optical receiver has a noise floor level, and the optical step pulse generating step generates interrogating optical step pulses that are greater than the distance to where the backscatter signal level equals the noise floor level.

12. The method of generating bandwidth corrected signal samples of an optical return signal from a fiber under test using an optical time domain reflectometer as recited in claim 9 wherein the optical step pulse generating step generates interrogating optical step pulses having a pulsewidth defined by a rising pulse edge and a falling pulse edge.

13. The method of generating bandwidth corrected signal samples of an optical return signal from a fiber under test using an optical time domain reflectometer as recited in claim 12 further comprising the steps of producing step impulse stimulus signal samples corrected for the bandwidth limited system response of the optical time domain reflectometer over the pulsewidth and generating signal samples representative of the impulse response for the fiber under test over the pulsewidth by taking the time derivative of the step impulse stimulus signal samples.

14. The method of generating bandwidth corrected signal samples of an optical return signal from a fiber under test using an optical time domain reflectometer as recited in claim 9 further comprising the step of displaying the bandwidth corrected signal samples.

15. A method of generating bandwidth corrected signal samples of optical return energy from a fiber under test using an optical time domain reflectometer having a bandwidth limited system response comprising the steps of:

generating interrogating optical step pulses that are launched into the fiber under test using an optical transmitter;

generating bandwidth limited signal samples of the optical return energy using an optical receiver;

producing step impulse response signal samples of the optical time domain reflectometer and fiber under test by taking the time derivative of the signal samples representative of the optical return energy; and generating signal samples representative of the impulse response of the fiber under test corrected for the bandwidth limited system response of the optical time domain reflectometer by modeling the optical time domain reflectometer as an exponential linear shift-invariant system that includes the optical transmitter, optical receiver and the fiber under test.

\* \* \* \* \*